United States Patent [19]
Kawai

[11] Patent Number: 6,144,183
[45] Date of Patent: Nov. 7, 2000

[54] MOTOR DRIVING SYSTEM AND MOTOR DRIVING CONTROL UNIT

[75] Inventor: Daisuke Kawai, Tokyo, Japan

[73] Assignee: Mitsubishi Denki Kabushiki Kaisha, Tokyo, Japan

[21] Appl. No.: 09/436,646

[22] Filed: Nov. 9, 1999

[30] Foreign Application Priority Data

Jul. 7, 1999 [JP] Japan ................................. 11-193145

[51] Int. Cl.⁷ ......................... H04B 10/30; G05B 19/414
[52] U.S. Cl. .............................. 318/675; 318/16; 318/34; 318/480; 388/907.5
[58] Field of Search .............................. 318/16, 560, 600, 318/625, 671, 675, 34, 480; 388/907.5

[56] References Cited

U.S. PATENT DOCUMENTS

| | | | |
|---|---|---|---|
| 4,792,995 | 12/1988 | Harding | 455/606 |
| 5,924,081 | 7/1999 | Ostendorf et al. | 705/30 |

FOREIGN PATENT DOCUMENTS

| | | | |
|---|---|---|---|
| 7-222489 | 8/1995 | Japan . | |
| 8-214564 | 8/1996 | Japan . | |
| 10-254524 | 9/1998 | Japan | G05B 19/414 |

*Primary Examiner*—Bentsu Ro
*Attorney, Agent, or Firm*—Sughrue, Mion, Zinn, Macpeak & Seas, PLLC

[57] ABSTRACT

A motor driving system comprises a plurality of motor driving control units each for controlling a motor and a controller for issuing a control command to a motor driving control unit. The controller and each of the motor driving control units have communication interfaces for infrared communications capable of transreceiving the signals. A loop communication using infrared rays is executed between the controller and one of the motor driving control units and also among the motor driving control units.

4 Claims, 7 Drawing Sheets

MOTOR DRIVING SYSTEM AND MOTOR DRIVING CONTROL UNIT

FIELD OF THE INVENTION

The present invention relates to a motor driving system and a motor driving control unit. More particularly, this invention relates to a motor driving system and a motor driving control unit that executes data communications between a controller and a motor driving control unit with the help of infrared rays.

BACKGROUND OF THE INVENTION

FIG. 6 shows a motor driving system according to the conventional technology. This motor driving system has a controller 100 and a plurality of motor driving control units 110 each provided with respect to each motor 50. The controller 100 issues a control command or the like to each of the motor driving control units 110. The controller 100 has a CPU 101, and a communication interface 102 used for executing infrared communications with the motor driving control unit 110.

The motor driving control unit 110 is based on an inverter system. The motor driving control unit 110 comprises a rectifier circuit 111 formed with a rectifier diode and a smoothing capacitor, a regenerating circuit 112 formed with a regenerative resistor and a regenerative transistor, an inverter circuit 113 for inverting output from the rectifier circuit 111 to an AC voltage for motor driving, a current detector circuit 114, a CPU 115 for providing controls over the inversion and regeneration; and a communication interface 116 for executing infrared communications with the controller 100.

In the conventional motor driving system, the controller 100 and the motor driving control unit 110 incorporate infrared interfaces 102 and 116 respectively. The motor driving control unit 110 receives a command from the controller 100 in the form of infrared rays and controls the driving of the motor 50 based on this command. Thus, a communication cable is not required in this conventional system between the controller 100 and the motor driving control unit 110.

When a system is formed in such a way that a plurality of motor driving control units 110 are provided for one unit of controller 100 as shown in FIG. 6, an identification code is previously allocated to each of the motor driving control units 110, and the controller 100 appends an identification code to a command and sends the command only to a motor driving control unit 110 that is to be controlled. Further, when a plurality of motors 50 are operated in synchronism with each other by the motor driving control units 110, the controller 100 also issues a command to the corresponding motor driving control unit in order to control driving of each of the motor.

FIG. 7 shows a conventional motor driving control unit having an operating section 123. The motor driving control unit 110 comprises a rectifier circuit 117 formed with a rectifier for generating DC control power for driving the CPU 115 and a peripheral IC as well as with a smoothing capacitor, a switching power transistor 118, a control IC 119 for controlling the switching power transistor 118, an insulation-reinforced transformer 120 for insulating a primary-side potential from a secondary-side potential to generate a DC control source voltage for driving the CPU 115 and peripheral IC, a feedback circuit 121 for managing whether the DC control source voltage for driving the CPU 115 and peripheral IC is a regular voltage or not, an insulation circuit 122 with an insulation amplifier or the like used for insulating the primary-side potential which gives an electric shock to a person if touched from the secondary-side potential which does not give an electric shock to even if touched, and an operating section 123.

The internal circuits of this motor driving control unit 110 are divided into the primary-side potential which gives an electric shock to a person if touched and the secondary-side potential which does not give an electric shock even if touched. In FIG. 7, the portion above the dotted line is the primary-side potential and the portion below this dotted line is the secondary-side potential. The internal circuits corresponding to the primary-side potential are the rectifier circuit 111 for rectifying power to the motor driving control unit, regenerating circuit 112, inverter circuit 113, current detector circuit 114, rectifier circuit 117 for generating DC control power for driving the CPU 115 and peripheral IC, switching power transistor 118, and transistor control IC 119 or the like. The internal circuits corresponding to the secondary-side potential are the interface section 116, CPU 115 and peripheral IC section, operating section 123 such as a switch, and a display section.

The primary-side potential is insulated from the secondary-side potential by the insulation-reinforced transformer 120 which uses the feedback circuit 121 for managing a source voltage for driving the CPU 115 and peripheral IC, and the insulating circuit 122 using an insulating amplifier or the like.

In the motor driving control unit 110, the rectifier circuit 111 rectifies and smoothes AC or DC voltage as control power, and generates a DC voltage to input the voltage to the insulation-reinforced transformer 120. The DC voltage is outputted to the secondary side of the insulation-reinforced transformer 120 according to the winding ratio, and is used, in this case, for driving the CPU 115 and peripheral IC. The voltage is fed-back because precision is required in the voltage in the second side, therefore, the control IC 119 controls the power transistor 118 to be ON when the voltage is low, and the control IC 119 controls the transistor to be OFF when the voltage is high. As the control IC 119 is generally provided in the primary-side potential, a photo-coupler is used inside the feedback circuit 121 in order to insulate the primary-side potential from the secondary-side potential. A voltage detection signal and a current detection signal in the primary-side potential are fetched to the CPU 115 in the secondary-side potential via the insulation circuit, while a regenerative drive signal and a IGBT drive signal are supplied from the CPU 115 in the secondary-side potential to a regenerative driving circuit and a IGBT driving circuit via the insulating circuit 122.

In the conventional motor driving system described above, when a number of motor driving control units provided with respect to one controller becomes larger, it may happen that the infrared rays from the controller may not reach to the motor driving control units due to the arrangement of the units. When the infrared rays do not reach a motor driving control unit, such a motor driving control unit will not operate as specified by a command, and there is a fear that the manufacturing line or the system may stop unintentionally.

Furthermore, in the conventional motor driving system, a distance to which the infrared rays can reach is limited. Therefore, it is necessary to place the controller with respect to a plurality of motor driving control units at such a position that the infrared rays from the controller will reach all the motor driving control units, so that there is a restriction over the placement of the units. Further, there is limitation over driving of the number of motors and over concurrent control of a large number of motor driving control units at a time, so that it has been difficult to perform a synchronized operation by a large-scale system or a large number of motors whose reliability and precision are required.

Further, in the conventional motor driving control unit, insulation-reinforced components such as a photocoupler, a transformer and an insulating amplifier are used for insulating a switch and a display unit or the like which are supposed to be touched by a person and a power source for driving a CPU and an IC from the primary-side potential which gives an electric shock to a person when touched. However, these components are costly, and in addition, an outer size of the unit becomes larger. Further, because the photocoupler has a limited life, the reliability may be affected when a large number of photocouplers are used.

SUMMARY OF THE INVENTION

It is an object of the present invention to obtain, for the purpose of solving the problems described above, a motor driving system which can surely send a command with the help of infrared rays from a controller to a plurality of motor driving control units without any restriction on the positions of the motor driving control units with respect to the controller. It is also an object of the present invention to obtain a motor driving system which can realize an accurate and complicated synchronized operation, and has a high flexibility in arrangement of the units. It is still another object of the present invention to obtain a motor driving system which does not require costly insulation-reinforced components.

In the motor driving system according to the present invention, the controller and each of the motor driving control units have communication interfaces for infrared communications capable of transreceiving the signals, and a loop communication using infrared rays is executed between the controller and one of the motor driving control units and also among the motor driving control units. Accordingly, if one of the units (a local unit) previously decides a partner unit with which the unit executes communications, the units can freely be arranged in an one-to-one relation within a distance at which infrared rays from one of the units can surely reach the other unit.

Further, in the motor driving control unit according to the present invention, there is no operating switch, connector, or cable that that may give an electric shock to a person when touched, so that a number of components can be reduced by removing an insulation circuit.

Other objects and features of this invention will become understood from the following description with reference to the accompanying drawings.

DESCRIPTION OF THE PREFERRED EMBODIMENTS

Detailed description is made hereinafter for the preferred embodiments of the motor driving system and motor driving control unit according to the present invention with reference to the attached drawings.

Figure 1:
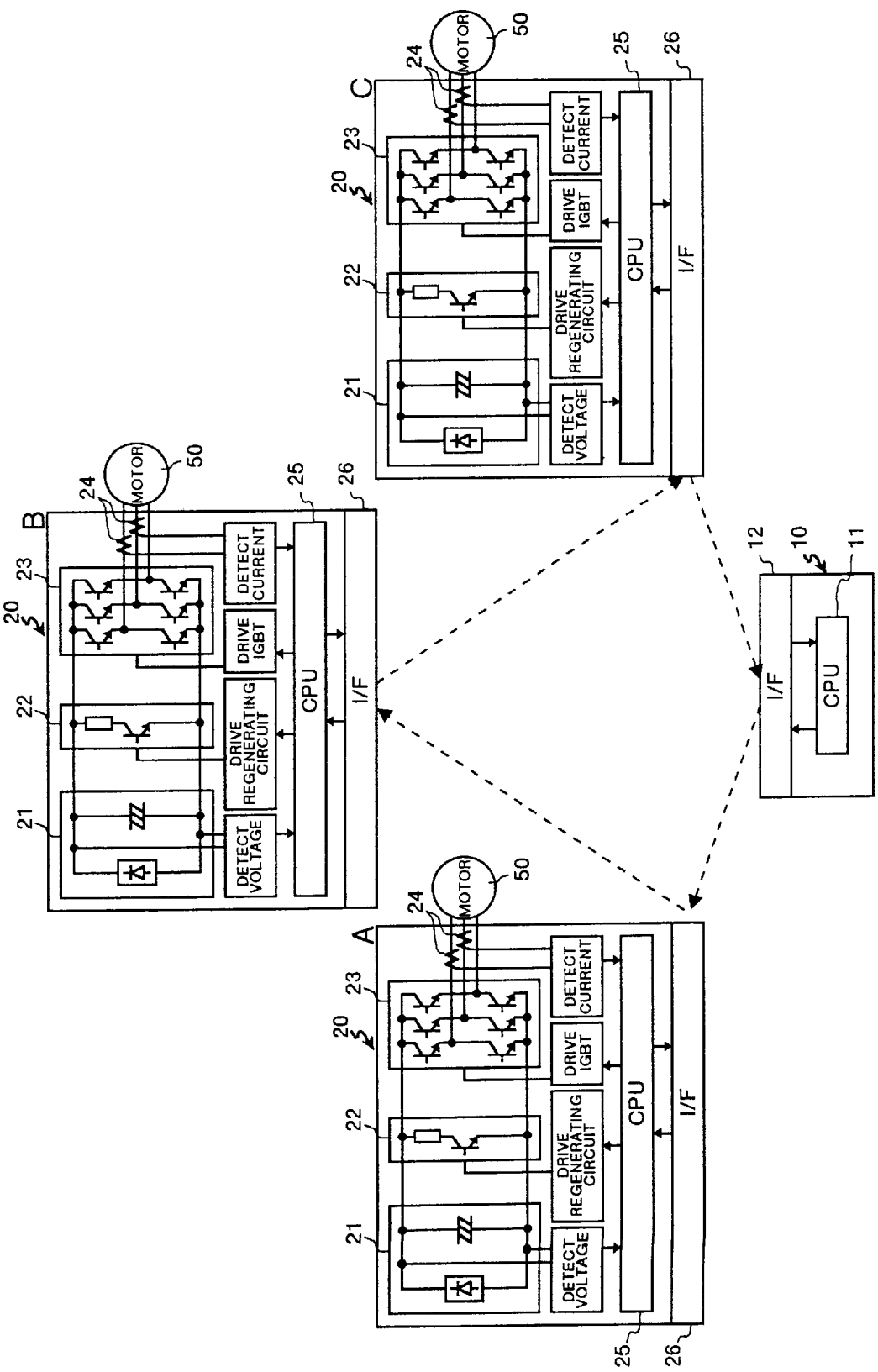
FIG. 1 shows an embodiment of the configuration of a motor driving system according to the present invention.

FIG. 1 shows an embodiment of the motor driving system according to the present invention. This motor driving system has a controller 10 and a plurality of motor driving control units 20 each provided with respect to each motor 50. Three motor driving control units 20 are provided in this embodiment. A code such as A, B, and C is previously allocated to each of the motor driving control units 20 so that each of the units can be differentiated utilizing these codes. When it is necessary to point any one of the three motor driving control units 20, the motor driving control unit 20 may be called as a motor driving control unit A, a motor driving control unit B, and a motor driving control unit C.

The controller 10 issues a control command or the like to each of the motor driving control units 20. The controller 10 has a CPU 11, and a communication interface 12 used for executing infrared communications with the motor driving control unit 20. The motor driving control unit 20 is based on an inverter system. The motor driving control unit 20 comprises a rectifier circuit 21 formed with a rectifier diode and a smoothing capacitor, a regenerating circuit 22 formed with a regenerative resistor and a regenerative transistor, an inverter circuit 23 for inverting output from the rectifier circuit 21 to an AC voltage for motor driving, a current detector circuit 24, a CPU 25 for providing controls over the inversion and regeneration, and a communication interface 26 used for executing infrared communications with the controller 10 and also with another motor driving control unit 20.

Both the communication interface 12 of the controller 10 and the communication interface 26 of the motor driving control unit 20 can receive and transmit infrared data.

In this motor driving system, the controller 10 transmits an infrared signal to the motor driving control unit A. The motor driving control unit A receives the infrared signal transmitted from the controller 10 and also transmits the infrared signal to the motor driving control unit B. The motor driving control unit B receives the infrared signal transmitted from the motor driving control unit A and also transmits the infrared signal to the motor driving control unit C. Lastly, the motor driving control unit C receives the infrared signal transmitted from the motor driving control unit B and also transmits the infrared signal to the controller 10. Thus, a device (controller or motor driving control unit) previously defines a (one) partner unit with which data transaction is executed and a loop communication is performed based on a token ring system.

In this case, infrared signals are transmitted and received between the controller 10 and the motor driving control unit 20 or between the motor driving control units 20. Therefore, it is necessary that the devices are placed at locations at which the can receive or transmit infrared rays to the corresponding devices. However, the necessity of placing the controller 10 at a location from where infrared rays can reach all of the motor driving control units 20 is eliminated.

Figure 2:
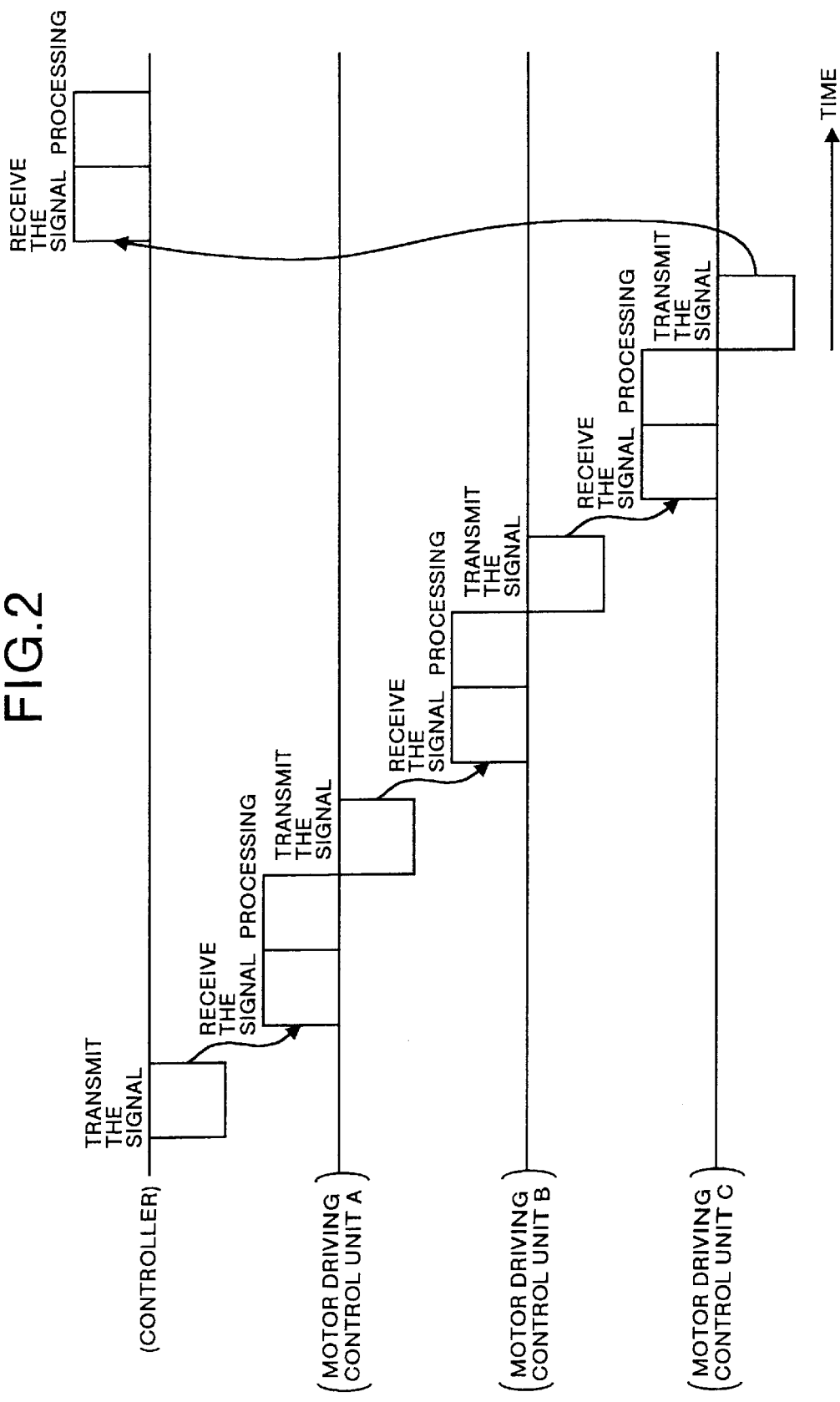
FIG. 2 is a timing chart showing infrared communication processing on the time series basis in the motor driving system according to the present invention.

FIG. 2 shows infrared communication processing between the controller 10 and motor driving control unit 20, and between the motor driving control units 20 on a time series basis. When the controller 10 issues a command to each of the motor driving control units 20, a signal indicating contents of the command is sent from the controller 10 to the motor driving control unit A. The motor driving control unit A receives this signal and executes processing according to it and then transmits the same signal to the motor driving control unit B. Similarly, communications are successively executed from the motor driving control unit B to the motor driving control unit C, and from the motor driving control unit C to the controller 10. With this, the controller 10 recognizes completion of the command.

Figure 3:
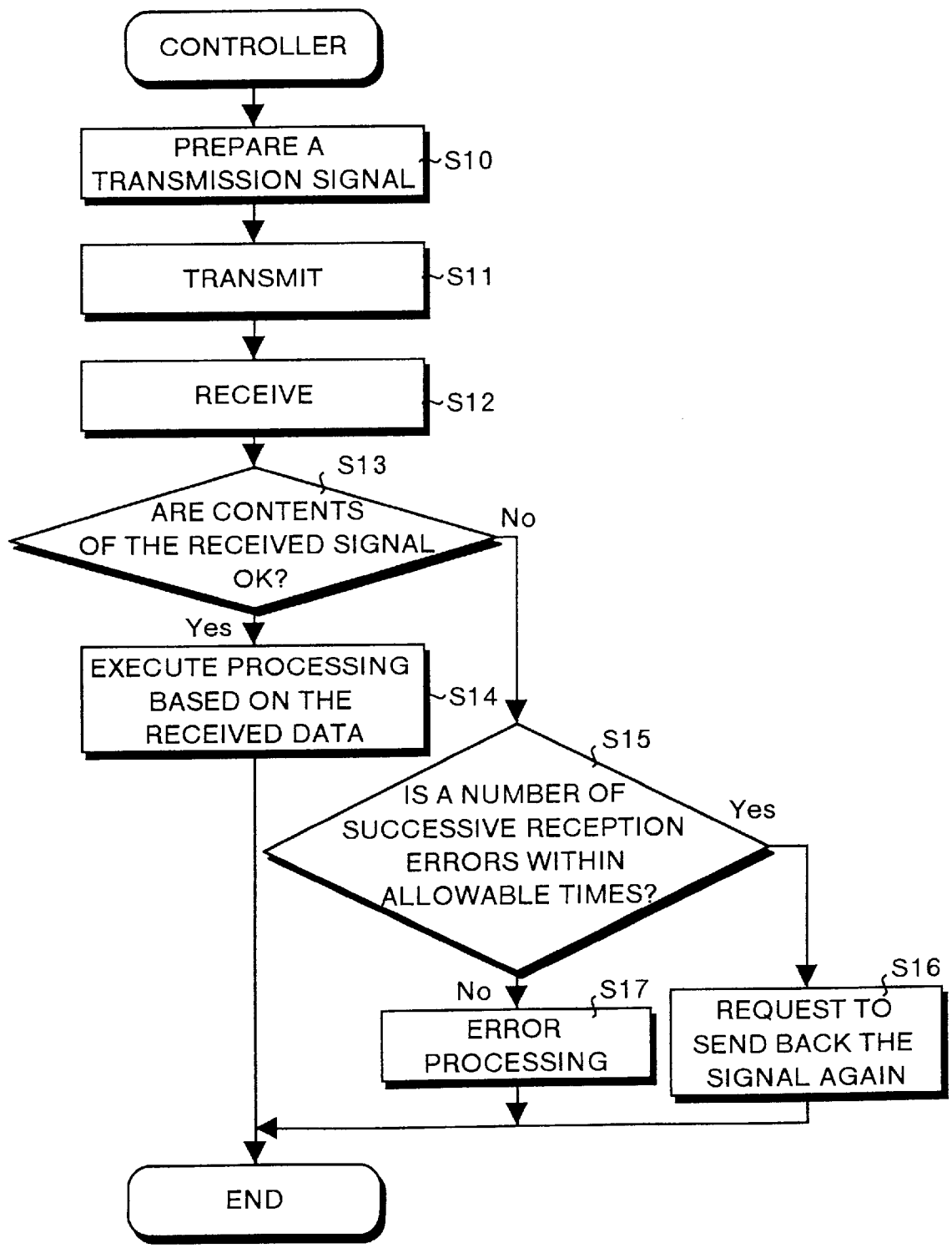
FIG. 3 is a flow chart concretely showing the communication processing by a controller in the motor driving system according to the present invention.

FIG. 3 shows in detail the contents of communication processing by the controller 10. The controller 10 prepares a signal that is to be transmitted (step S10), and transmits infrared rays based on the prepared signal to the motor driving control unit A (step S11). Further, the controller 10 also receives infrared rays based on a signal from the motor driving control unit C (step S12). The controller 10 checks the contents of the received signal (step S13), and executes a processing based on this signal if the contents are correct (step S14). On the other hand, if the contents of the received signal is not correct, the controller 10 checks a number of times of successive reception errors (step S15), and transmits a request to the source of the signal to send the command once more if the errors are within allowable times (step S16). It should be noted that, error processing is executed if reception errors occur successively more than the prespecified times (step S17).

Figure 4:
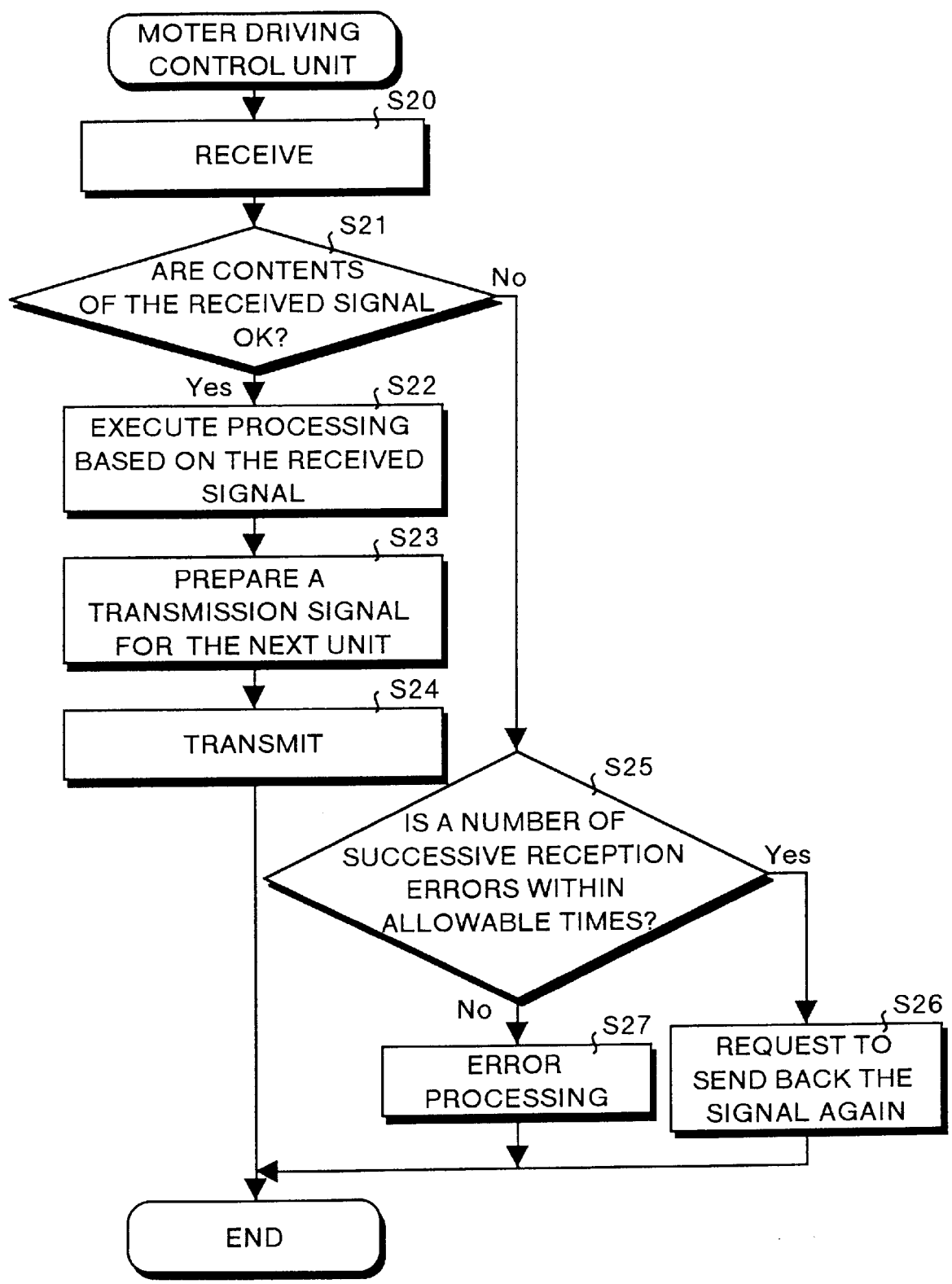
FIG. 4 is a flow chart concretely showing the communication processing by a motor driving control unit in the motor driving system according to the present invention.

FIG. 4 shows in detail the contents of communication processing by each of the motor driving control units. The motor driving control unit 20 receives infrared rays based on a signal from the controller 10 or from other motor driving control unit 20 as the source of the signal (step S20). Then, the motor driving control unit 20 checks the contents of the received signal (step S21), and executes processing based on this signal if the contents are correct (step S22). Then, the motor driving control unit 20 prepares a transmission signal to be transmitted to the next device (step S23) and transmits the signal (step S24).

On the other hand, if the contents of the received signal is not correct, the motor driving control unit 20 checks a number of times of successive reception errors (step S25), and transmits a request to the source of the signal to send the command once more if the errors are within allowable times (step S26). It should be noted that, error processing is executed if reception errors occur successively more than the prespecified times (step S27).

An example of a case in which three motors 50 are operated in synchronism with each other will be explained below. When the motor in the motor driving control unit A is rotated at 100 r/min, the motor in the motor driving control unit B is rotated at 500 r/min, and the motor in the motor driving control unit C is rotated at 1000 r/min, the controller 10 prepares commands, as one transmission signal, so as to rotate the motor in the motor driving control unit A at 100 r/min, rotate the motor in the motor driving control unit B at 500 r/min, and rotate the motor in the motor driving control unit C at 1000 r/min, and transmits the signal to the motor driving control unit A.

The motor driving control unit A reads the contents from the received signal that the motor 50 is to be rotated at 100 r/min, therefore controls the motor 50 so that it runs at 100 r/min. Then, the motor driving control unit A transmits the signal received from the controller to the motor driving control unit B. The motor driving control unit B reads the contents from the received signal that the motor 50 is to be rotated at 500 r/min, therefore controls the motor 50 so as that it runs at 500 r/min. Then, the motor driving control unit B transmits the signal received from the motor driving control unit A to the motor driving control unit C. The motor driving control unit C reads the contents from the received signal that the motor 50 is to be rotated at 1000 r/min, therefore controls the motor 50 so that it runs at 1000 r/min. Then, the motor driving control unit C transmits the signal received from the motor driving control unit C to the controller 10. The controller 10 receives the signal from the motor driving control unit C, and recognizes that the signal has been transmitted to all the motor driving control units.

In order that the controller 10 can recognize each state of the motor driving control units 20, data such as a rotating speed and a torque of each of the motor driving control units 20 is appended to the signal for a loop communication, so that the data can be transmitted to the controller 10.

When the motors 50 are to be stopped, a signal for stopping each motor 50 in each of the motor driving control units A, B, and C is similarly transmitted in a loop from the controller 10 and the motors are stopped.

As described above, in the infrared loop communication, when a unit previously decides a partner unit with which communication is executed and both units are located within a distance at which infrared rays from one of the units can accurately and surely reach the other one, it is possible to control any number of motor driving control units 20 by a single controller 10. In addition, complicated and high-precision synchronization operation and program operation can be performed by making a cycle time of a series of communication shorter.

Incidentally, in this infrared loop communication, a number of controllers to be provided is not limited to one. For instance, a plurality units of controller may be provided, and two or more of systems may be linked to each other through infrared communications executed between controllers. Furthermore, a unit only playing a role of a relay to surely convey infrared rays may be included in the infrared loop other than the motor driving control unit and controller. Further, the signal from the last unit may not come back to the controller 10 if it is not necessary as allowed in specifications of a system.

Figure 5:
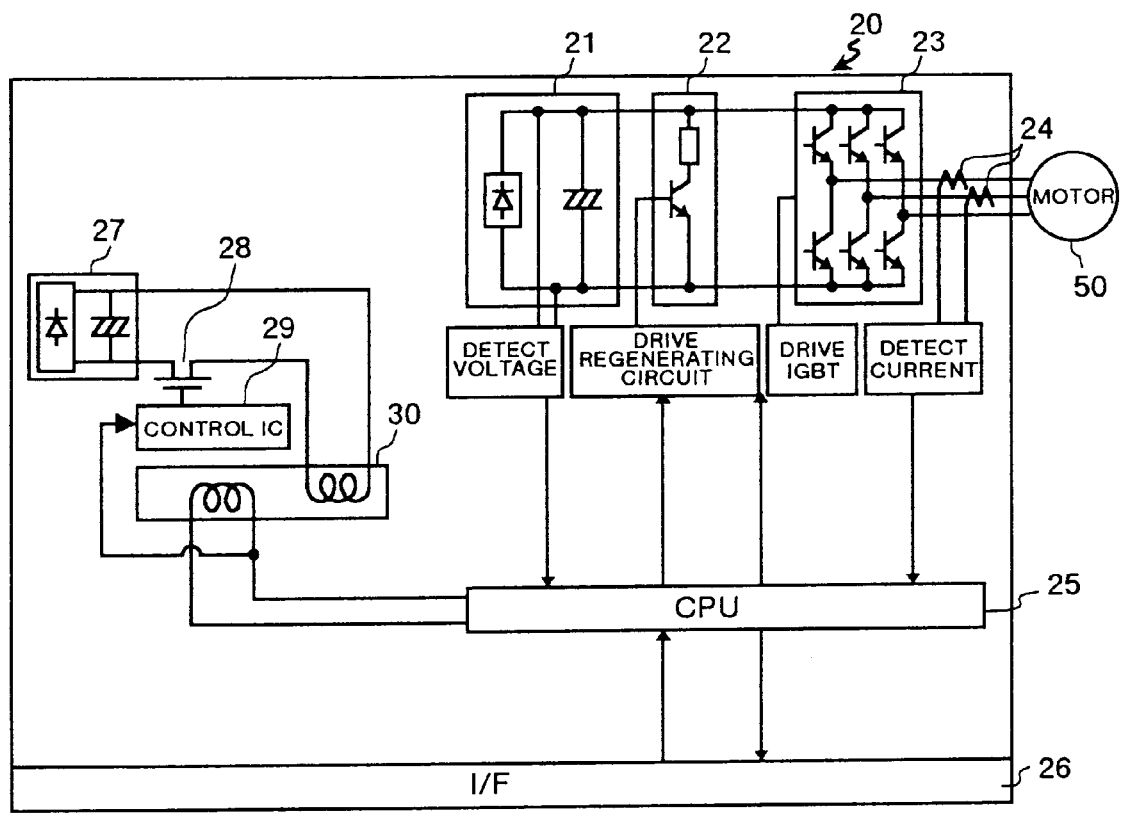
FIG. 5 is a block diagram that shows an embodiment of the motor driving control unit according to the present invention.
Figure 6:
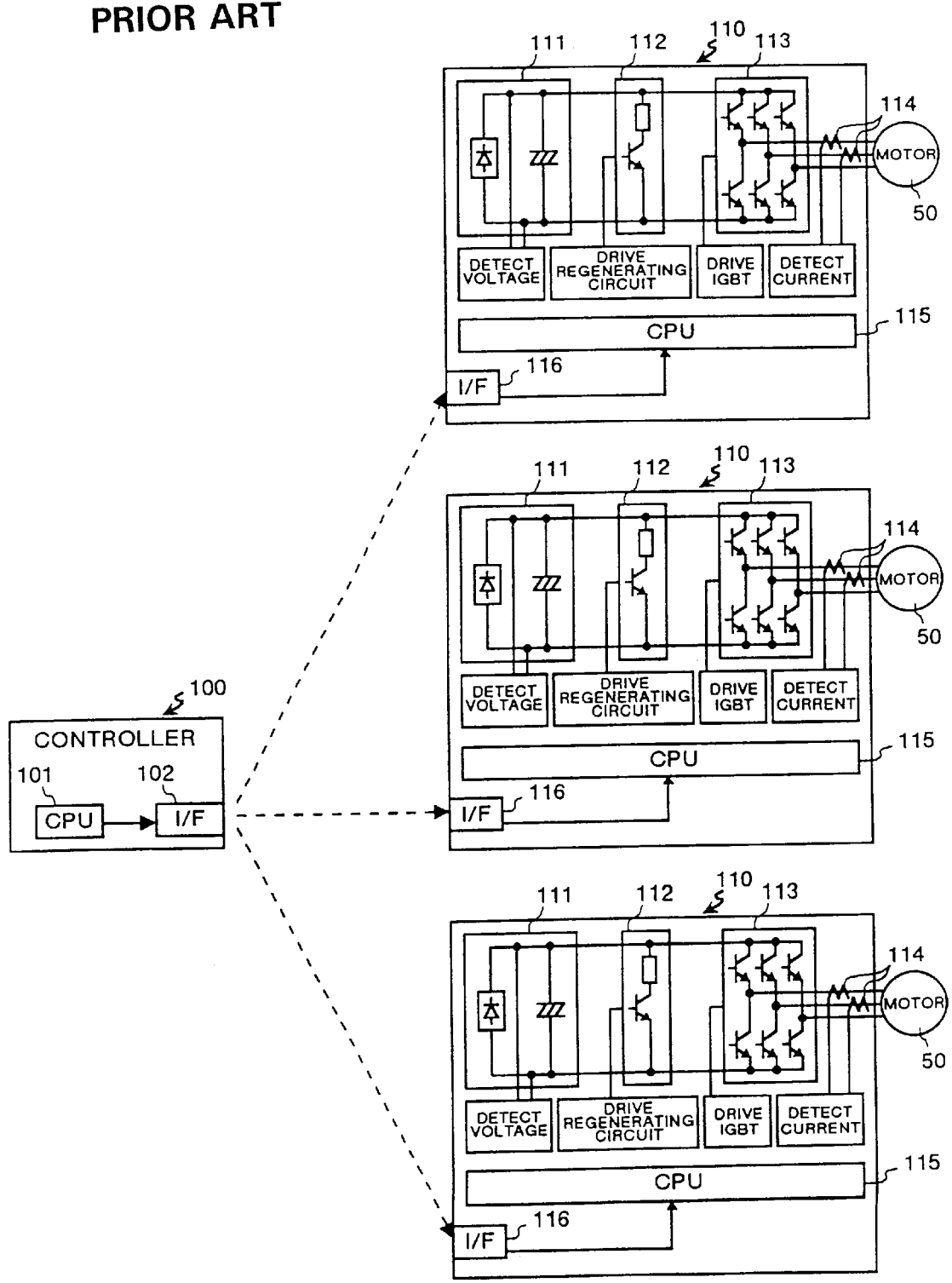
FIG. 6 shows the configuration of a motor driving system based on the conventional technology.
Figure 7:
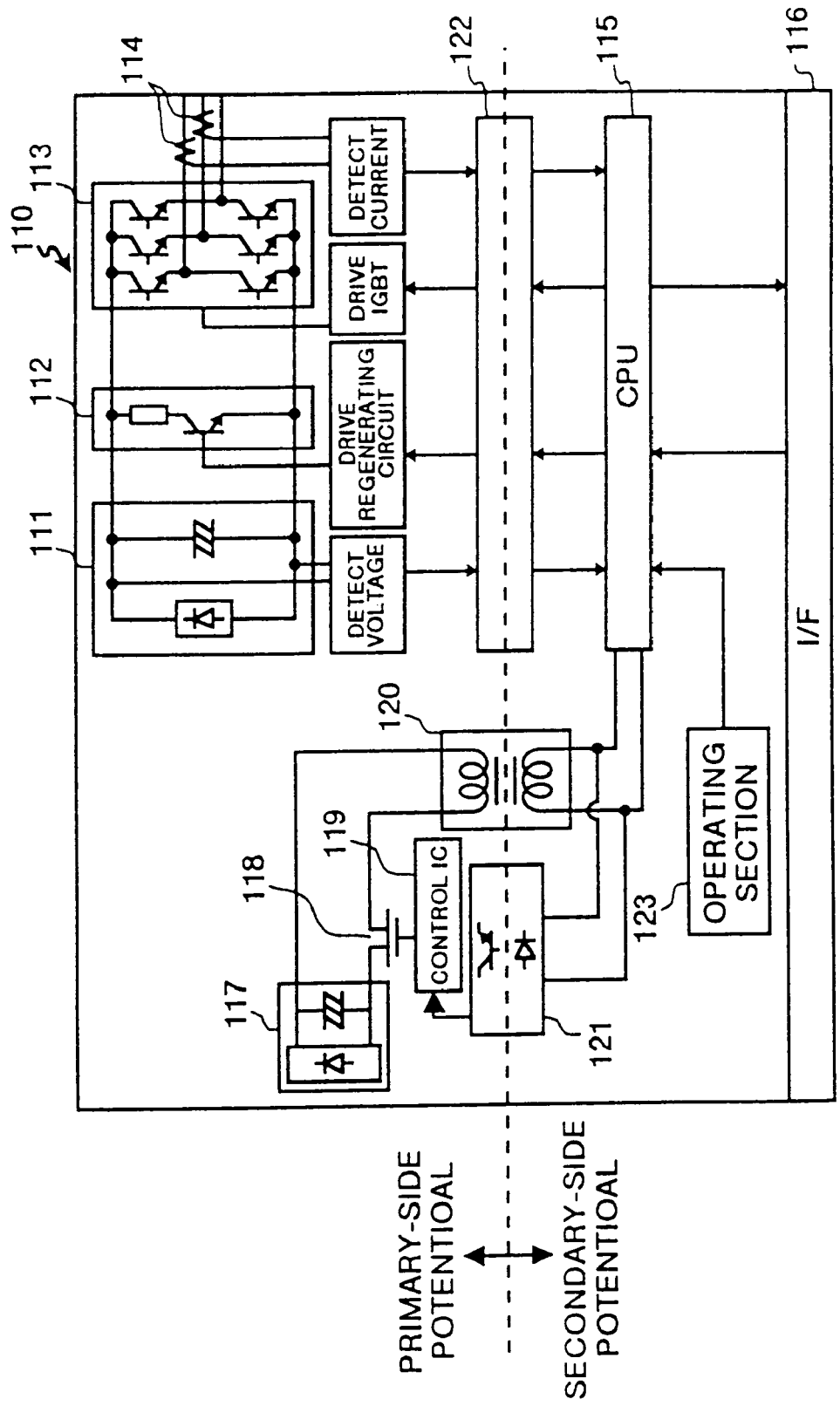
FIG. 7 is a block diagram that shows a motor driving control unit based on the conventional technology.

FIG. 5 shows an embodiment of the motor driving control unit according to the present invention. The motor driving control unit 20 comprises a switching power transistor 28; a control IC 29 for controlling the switching power transistor 28; and a transformer 30 for generating DC control source voltage for driving the CPU 25 and a peripheral IC other than the rectifier circuit 21, regenerating circuit 22, inverter circuit 23, current detector circuit 24, CPU 25, and communication interface 26 for infrared communications.

When the interface section which a person may touch, the CPU and the peripheral IC section, the operating section such as a switch, and a display section are provided in the motor driving control unit, the insulation circuit is required between the primary-side potential and the secondary-side potential inside the motor driving control unit according to the conventional technology in order to insure insulation from the primary-side potential. However, as in the motor driving control unit 20 according to the present invention which executes infrared communications where there are no operating switch, connector, and cable each of which is supposed to be touched by a person during the passage of electric current therethrough, the insulation circuit between the primary side and the secondary side is unnecessary as shown in FIG. 5. Thus, a motor driving control unit 20 can be configured with all the components in the primary-side potential.

Therefore, in the circuit which generates power for driving the CPU 25 and peripheral IC, it is not necessary to use the transformer 30 having insulation-reinforced components, and only the winding ratio is required to be taken care of. In addition, the need for using insulating components such as a photocoupler for feedback of a source voltage for driving the CPU 25 and the peripheral IC will be eliminated because insulation from the control IC 29 is not required any more.

As described above, a source voltage for driving the CPU 25 and peripheral IC can be generated simply and easily based on the configuration with all the components in the primary-side potential. Further, signal transactions between the CPU 25 and the voltage detector circuit, regenerative driving circuit, IGBT driving circuit, or the current detector circuit are also possible without requiring any insulation circuit. Therefore, a number of components can be reduced and a packaging area on a printed board can be made smaller. Resultantly, a downsized and low-cost motor driving control unit is obtained.

A photocoupler or the like is used in the insulation circuit, but the photocoupler has a limited life. Because there is no insulation circuit, a number of photocouplers is reduced drastically which enhances the reliability of the motor driving control. Further, there is no need to insulate and reinforce the transformer 30, so that downsizing, weight reduction, and cost reduction can be achieved.

As understood from the description above, in the motor driving system according to the present invention, the controller and each of the motor driving control units have communication interfaces for infrared communications capable of transreceiving the signals, and a loop communication using infrared rays is executed between the controller and one of the motor driving control units and also among the motor driving control units. Accordingly, if one of the units (a local unit) previously decides a partner unit with which the unit executes communications, the units can freely be arranged in an one-to-one relation within a distance at which infrared rays from one of the units can surely reach the other unit. Therefore, with the motor driving system according to the present invention, a large-scale system having a large number of motor driving control units can be realized. In addition, a synchronized operation by a large number of motors requiring reliability and precision as well as a complicated program operation can also be realized.

In the motor driving system according to another aspect of the present invention, one of the units (a local unit) previously decides a partner unit with which the unit executes communications and a loop communication using infrared rays is executed therebetween. Therefore, with the motor driving system according to the present invention, the units can freely be arranged in an one-to-one relation within a distance at which infrared rays from one of the units can surely reach the other unit, so that a large-scale system having a large number of motor driving control units can be realized. In addition, a synchronized operation by a large number of motors requiring reliability and precision as well as a complicated program operation can also be realized.

In the motor driving control unit according to the present invention, because there is no operating switch, connector, or cable that that may give an electric shock to a person when touched, a number of components can be reduced by removing an insulation circuit, which allows improved quality, cost down, downsizing, and weight reduction.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A motor driving system comprising:

a plurality of motor driving control units operative to drive respective motors according to received command signals, said plurality of motor driving control units each comprising a transreceiver interface for transmitting and receiving said command signals via an infrared beam; and a controller unit operative to generate and transmit said command signals via said infrared beam to a first one of said plurality of motor driving control units, said controller unit operative to receive said command signals via said infrared beam from a last one of said plurality of motor driving control units different than said first one, wherein said command signals are transmitted and received between said controller and said plurality of motor driving control units according to a token ring communication protocol.

2. The motor driving system according to claim 1, wherein each of said plurality of motor driving units further comprises means for processing a received command signal and for transmitting said command signal to a next unit down-line, and wherein said controller unit comprises processing means for generating, transmitting, receiving, and error checking said command signals.

3. The motor driving system according to claim 2, wherein said means for processing a received command and for transmitting said command signal also processes said command signal to determine whether errors are present.

4. A motor driving control unit for driving a motor, said motor driving control unit comprising:

a rectifier circuit having a rectifier diode and a smoothing capacitor;

a regenerating circuit connected to said rectifier circuit, said regenerating circuit including a regenerative resistor and a regenerative transistor;

an inverter circuit for inverting an output from the rectifier circuit to an AC voltage for driving said motor;

a current detector circuit detecting a current of said AC voltage for driving said motor;

a CPU connected to said rectifier circuit, regenerating circuit, inverter circuit, and current detector circuit, said CPU for controlling inversion and regeneration according to a control signal;

a communication interface connected to said CPU operative to receive and transmit infrared communications containing said control signal;

a switching power transistor;

a control IC for controlling the switching power transistor; and a transformer for generating DC control source voltage for driving the CPU according to the switching power transistor and control IC, wherein all of the components of the motor driving control unit are configured on a primary potential side of said transformer.

* * * * *